United States Patent [19]
Chevalier

[11] 3,968,652
[45] July 13, 1976

[54] APPARATUS RESPONSIVE TO SOLAR ENERGY FOR PRODUCING POWER

[76] Inventor: Donald M. Chevalier, 248 15th Ave. S., Great Falls, Mont. 59405

[22] Filed: June 9, 1975

[21] Appl. No.: 585,126

[52] U.S. Cl. .................................. 60/641; 126/271
[51] Int. Cl.² ................................................ F03G 7/02
[58] Field of Search ................ 126/270, 271; 60/641

[56] References Cited
UNITED STATES PATENTS

| | | | |
|---|---|---|---|
| 1,989,999 | 2/1935 | Niederle | 60/641 |
| 2,920,710 | 1/1960 | Howard | 60/641 |

FOREIGN PATENTS OR APPLICATIONS

| | | | |
|---|---|---|---|
| 137,424 | 12/1902 | Germany | 60/641 |

*Primary Examiner*—Allen M. Ostrager

[57] ABSTRACT

Apparatus responsive to solar energy for driving a self-contained gas turbine, whereby to produce mechanical or electrical power. Such apparatus is provided with a screen of a reflective nature and of a type to essentially focus the incoming rays of the sun onto a central window. A pair of serpentine coils are disposed rearwardly of the window and are constructed for alternate registry therewith. A gas turbine is operatively connected to and between the two coils. The rays of the sun are employed to heat the coils, alternately, so as to expand the gas or vapor therein, increasing the pressure thereof, for driving the turbine. The alternate heating of the coils produces opposite revolvement of the turbine, the output from which can be made uni-directional by conventional means. Water storage tanks and spraying means, with a cooling fan, can be employed for alternate daytime and nighttime usage.

9 Claims, 9 Drawing Figures

APPARATUS RESPONSIVE TO SOLAR ENERGY FOR PRODUCING POWER

The present invention relates to solar-powered, powered generating systems and, more particularly, to new and improved apparatus which utilizes the sun's rays in driving a gas or vapor-powered turbine.

In the invention, a screen is used which is provided with an aperture or a window, preferably centrally disposed. The screen is concave and is preferably made up of a series of mirrors of similar materials having reflective surfaces, the orientation of the screen being such that oncoming sun's rays are focused essentially at the central window area.

First and second, heat-responsive gas storage means, as in the form of a pair of planar, serpentine configured tubular portions, are mounted upon a track proximate the window area of the screen and generally rearwardly thereof. These conduit portions are registerable, alternatively, with the window for receiving light emanations from the sun and from the surrounding reflective surfaces of the screen. The conduit portions, in being track-mounted, are easily movable, by hand or mechanically, such that first one and then the other of the conduit portions is disposed in registry with the window.

Permissibly, spraying means may be used for spray-cooling the heated conduit portion of the structure once the same has been translated beyond the window area, to be disposed behind the screen. This accelerates the reduction in gas pressure of this particular conduit, to aid in the receptive return of gas previously expelled. Additionally, such cooling effects a general suction or substantial lowering of the gaseous pressure, to advantageously work with the remaining tubular conduit which is not now being heated proximate the window area.

In a preferred embodiment of the invention a pair of storage tanks are used, one for collected hot water and also one for cool water. Thus, during daytime usage of the apparatus, sprayed water that is sprayed onto the hot pipes or conduit of the system in turn becomes warm, and the heated water is returned to the hot water storage facility. Cold water during this time, of course, will be used for pumping to the spraying means of the apparatus for the cold-spray operation. During periods of nighttime use, the hot water is employed to again spray the pipes, but this time a heat-transfer relationship exists such that the heat of the hot-water spray operates to increase the pressure of the gas within the particular conduit portion being sprayed. Hence, an expansion of gas results in an increased pressure which serves to drive the turbine at night. A fan, disposed rearwardly of the window, will serve to cool the remaining conduit portion such that such reduced pressure as is developed "sucks in" the gas to thereby increase the efficiency of the gas turbine. Thereafter, such cool portion is heated by the sprayed hot-water technique previously described so that the gas turbine will be powered in a reverse direction. Electrical power can be produced whether the turbine at the shaft is revolved in one direction or in both directions, by conventional techniques and structures.

Accordingly, a principal object of the present invention is to provide an improved solar-operated, gas-turbine power structure which is responsive to the reception of solar energy for driving a gas turbine self-contained in the system.

A further object is to provide a solar energy responsive power system wherein a closed sub-system, including a gas turbine and side heating coils, is used, which coils are disposed alternately in registry with a solar-power receiving window of the apparatus employed.

A further object is to provide solar-energy responsive power means wherein the same can be operated at nighttime for producing energy, this by a water spray collection system that can be recycled to the gas-containing coils of the unit.

An additional object is to provide a solar-energy responsive gas turbine unit which incorporates feasibility for generating power both during daytime and nighttime intervals.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Figure 1:
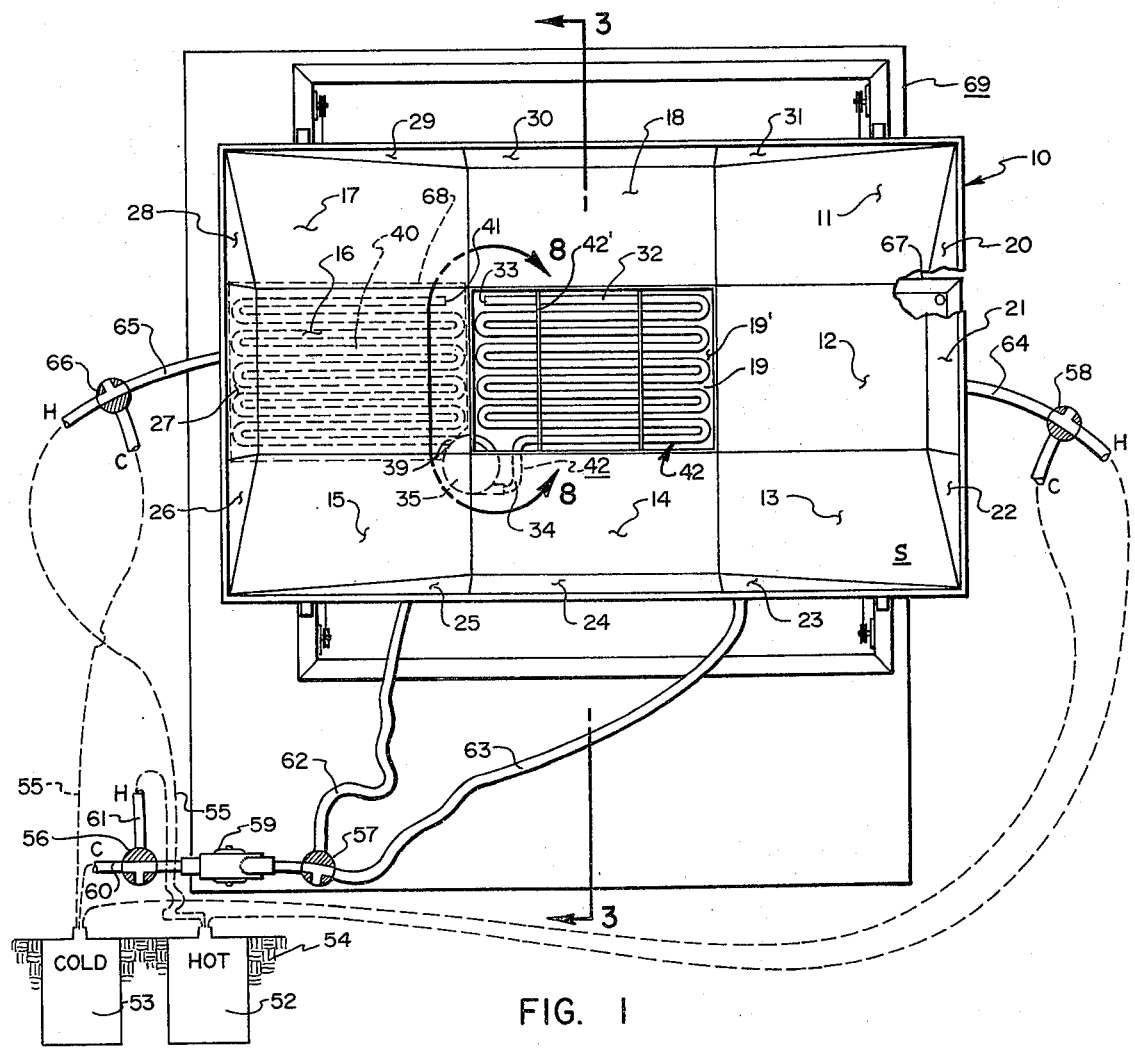
FIG. 1 is a top plan of the apparatus of the invention in a preferred form thereof, illustrating the reflective screen as having a central window exposing a particular heating coil beneath and in registry therewith.
Figure 8:
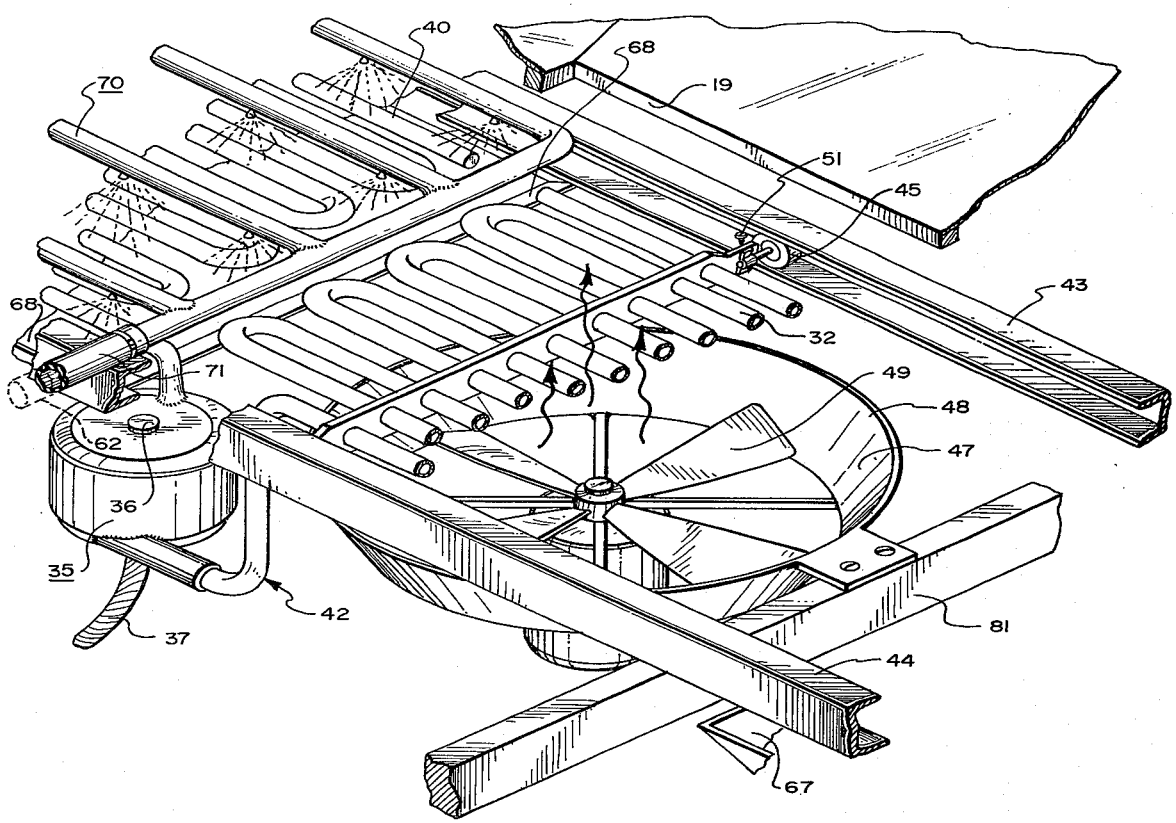
Figure 9:
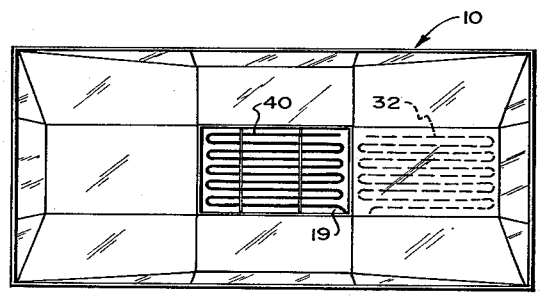

FIG. 8 is an enlarged, perspective view of the tubular gas-sotrage portions of the invention, with one portion being disposed in registry with the window and fan of the structure; and FIG. 9 is a fragmentary view, in reduced scale, and similar to FIG. 1, that illustrates the heating coils employed as having been translated such that the second coil is now exposed to the sun's rays and the first coil is disposed in cooling position.

In FIG. 1, framework 10 of screen S holds a series of mirrors 11–18 which are arranged somewhat in essentially rectangular form. The framework, however, includes a central open area 19 which comprises a central window. This window may be covered by a clear glass 19' if desired. Mirrors 20–31 are edge mirrors which serve further to complete the essentially concave nature of the entire screen S. These may be fitted into individual frameworks, the mirrors may be epoxied together, or other suitable structure may be employed for supporting the mirrors in the configuration shown.

Figure 3:
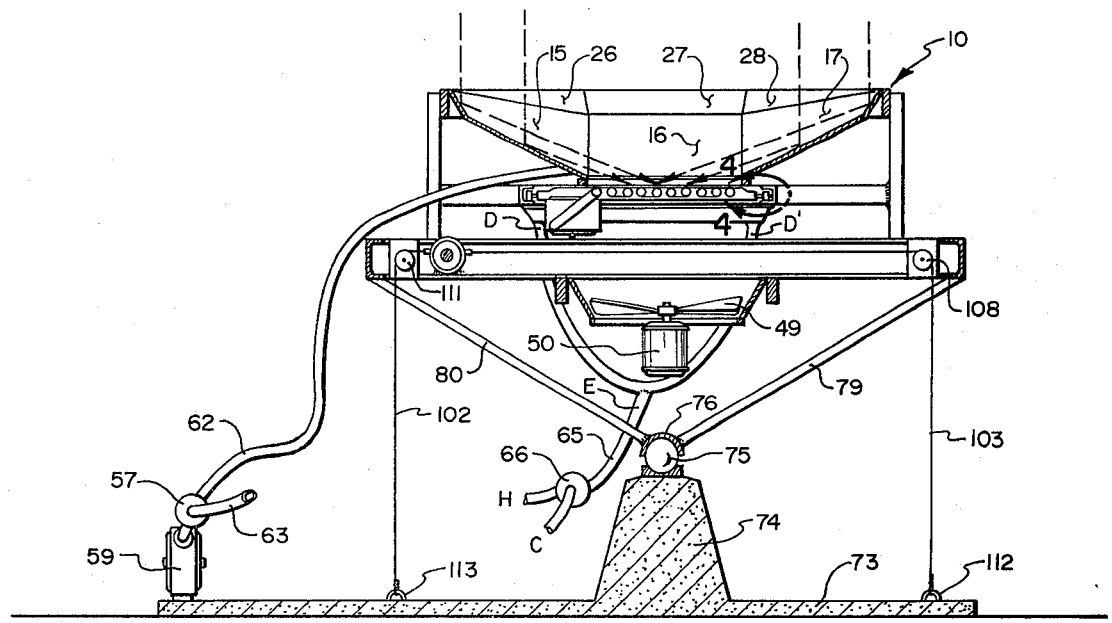
FIG. 3 is a section in slightly reduced scale and is taken along the line 3—3 in FIG. 1.
Figure 4:
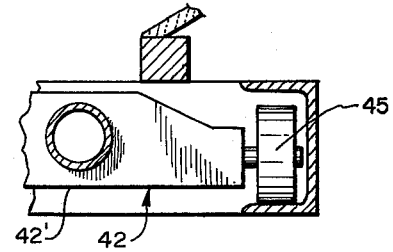
FIG. 4 is an enlarged, fragmentary detail taken along the line 4—4 in FIG. 8, illustrating the structure by which wheels or rollers can be employed to journal the heated and cooled gas-containing conduit portions of the apparatus, whereby such conduit portions can be moved back and forth so that a chosen one is disposed in registry with the central window of FIG. 1.
Figure 5:
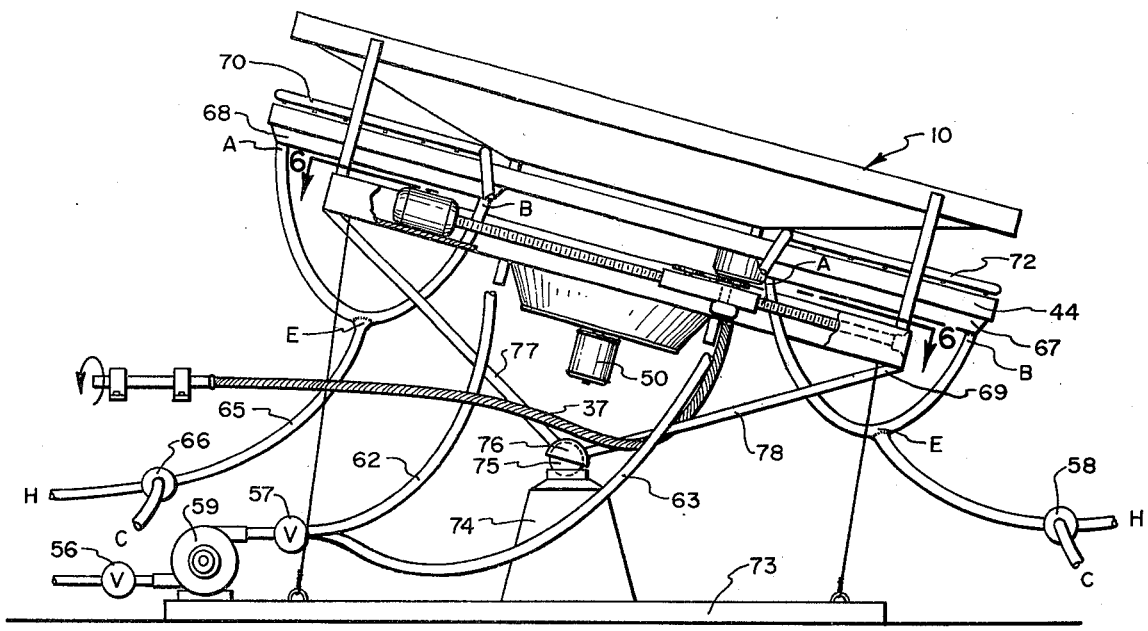
FIG. 5 is a partially-sectioned side elevation similar to FIG. 3 and illustrates the tilting of the structure to accommodate the sun's azimuth at a particular time.

FIG. 1 illustrates that there is centrally disposed behind window 19 a serpentine-configured, gas storage conduit or tubular portion 32 which is closed-ended at 33. The open end 34 thereof connects directly to a gas turbine 35, see FIGS. 1 and 8, which is provided with a central shaft 36 and to which flexible shaft 37 is attached. An end 39 of serpentine tubular portion 40 is likewise connected to the gas turbine 35 which proceeds in the dotted line configuration shown in FIG. 1 to closed end 41. As is seen in FIG. 8 both tubular portions, which comprise closed gaseous storage portions, are formed in a unit with the gas turbine 38, communicating at respective inner ends therewith; the turbine may be considered as a part of travelling unit 42 which is carried by tracks 43 and 44. Accordingly, a series of wheels as at 45, for example, operate to carry the unit 42 back and forth along tracks 43 and 44. The unit is thus disposed over that area 47 which is formed by fan shroud 48. Shroud 48 encloses a central fan 49 which is always disposed in fixed position in the manner shown in FIGS. 3 and 8. Such fan will include the usual motor 50 and also electrical connection means, not shown. FIG. 4 illustrates a representative wheel 45, four or six of which may be employed, by way of example, to carry the conduit portions' framework 42' back and forth via tracks 43 and 44.

FIG. 1 illustrates the framework 42' to be at a position wherein the tubular portion 32 is at a central location, i.e. at window 19. This is when the framework 42 is in one position, i.e. to the left as shown in FIG. 1. It will be seen that the unit 42 of which framework 42 is a part, may also be moved to the right, to the position shown in FIG. 9 wherein this time the tubular portion 32 is in line with window 19 and hence exposed directly to the sunlight. The unit may be moved mechanically by suitable motor, rack and pinion means, for example, or may be transported from one position to another simply manually. It is intended that the unit 42 be in the position shown in FIG. 1 for daytime use, whereas the operator will position the unit in the manner shown in FIG. 1A for nighttime use. A locking screw 51 can be provided the movable unit 42 so as to lock the unit 42 in position at a particular station within tracks 43 and 44 so that the same will not move inadvertently until the operator chooses, i.e. for the next light condition.

Hot and cold water storage tanks 52 and 53 may be disposed in the ground or earth 54 and be suitably insulated to retain their essential temperature condition. A series of lines as at 55, by way of example, connect the hot and cold lines shown to the tanks, as shown by the entire dotted-line configuruations.

The valves 56, 57, and 58 provided in the hydraulic circuit shown may be two-way valves, and are manually operable in the standard manner. A pump 59 is interposed between valves 56 and 57 and serves to pump water relative to conduit 60–63 in the manner as hereinafter described.

The structure orienting framework 10 relative to the sun's position at any particular time will be described hereinafter.

Figure 2:
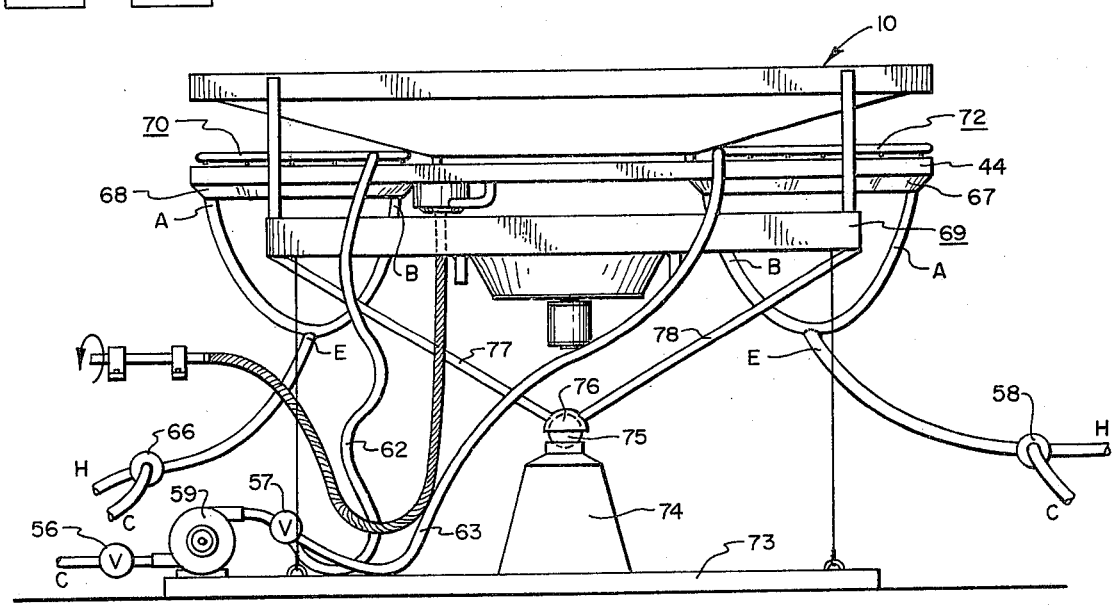
FIG. 2 is a front-side elevation of the structure of FIG. 1, showing the plumbing required in operating the drain and other portions of the system.

At this point it is germane to discuss the structure connected to conduit 62 and 63 as well as drain conduit 64 which leads to valve 58. It is first to be noted that a second drain conduit 65 is supplied valve 66. Framework structure 10 is provided with two draining pans 67 and 68. These are disposed immediately underneath the rectangular areas 12 and 16 in FIG. 1 and also are shown as affixed to framework structure 10, by any conventional means, in FIG. 2. Drain pans 67 and 68 are affixed to tracks 44 and 43 which are stationary relative to framework 10 and also to base framework 69. Each drain pan has a drain conduit A, B, D, and D' at each of the four corners of each pan. Such conduit join in a respective common drain conduit E for each of the pans, conduit E leading to respective valve 66, 58.

Valves 58 and 66 may be gauged or may comprise a single valve, and are turned to a condition depending upon whether the drain fluid or water is to be directed into the cold tank or into the hot tank 53 or 52 in FIG. 1.

The structure as thus far described operates as follows: Tubular portion 32, when exposed directly to the sun's rays through window 19, receives such rays directly and also by virtue of the several reflecting mirrors 11–18, and also 20–31. This tubular portion 32 will be filled with a suitable gas that expands and, in such expansion, will revolve gas turbine 35 and hence revolve shaft 36 and flexible shaft 37 in FIG. 8.

The gas escaping from serpentine tubular portion 23 and proceeding through the gas turbine will enter serpentine tubular portion 40, to be stored there at reduced pressure and away from exposure to the sun's rays, either directly or indirectly. At this point, and, if desired, the conduit 40 can actually be sprayed by spray mechanism 70 comprising a series of perforate pipe having an inlet 71. Inlet 71 is directly connected to conduit 62 of FIGS. 1 and 8. Accordingly, and with the valves 55 and 57 set properly, water will be pumped by pump 59 through valve 57 to conduit 62, with valve 57 oriented in a direction reverse to that shown, so that sprayed water impinges upon tubular portion 40. Such water will heat up through contact with tubular portion 40, and will be drained by the drain pan 68 and conduit A and B through conduit E to the hot water at 52 via valve 66 and the hot line H in FIG. 2. Once this operation is completed, then the user will manually or otherwise move unit 42 to the right, relative to FIG. 1, so that now tubular portion 40 comes in registry with the central window 19 in FIG. 1. At this point the valves are adjusted so that as the gaseous media heats up within tubular conduit 40 and drives gas turbine 35, then the collecting gas in tubular portion 32 will be cooled by spraying means 72 in FIG. 2, corresponding in configuration and function to spraying means 70 previously discussed and shown in FIGS. 2 and 8. Thus, the spraying means cools the heated gas within tubular portion 32 and the heated water draining from the spraying means or pipe at 72 drains into pan 67 to be carried by its conduit A, B, and E, via valve 58 to hot water tank 52 in FIG. 1.

For nighttime usage valve settings are reversed such that hot water is sprayed onto a respective one of the tubular portions, such as tubular portion 32, to heat the gas and drive the turbine for nighttime use. The remaining tubular portion, as for example tubular portion 40 in FIG. 1, is then sprayed so that hot water is sprayed over tubular conduit portion 40 at nighttime to heat the gas therein and drive the turbine 35. The remaining tubular portion 42 is cooled by fan 49 so that the gas essentially compresses within this portion. Thereafter, the unit can be moved and the opposite tubular portion is sprayed by the hot water from hot water tank 52.

The azimuth or tilt structure supporting structure 10 will now be described. Base support 73 includes an upstanding universal fulcrum 74 having ball 75. Member 76 comprises a socket member 76 to which are affixed braces 77, 78, 79, and 80.

These braces 78–80 are connected to the four corners of base framework 69. Framework 69 is shown to include cross braces 81 and 82 and cripples 83 and 84 for securing the fan 49 in position as shown in FIG. 6.

In order for the unit to be operated for proper orientation for the sun in its many dispositions, a tilting mechanism is needed. One type of mechanism system for this purpose is shown in FIGS. 6 and 7. A first mechanism includes a motor 85 which is mounted to gusset 86 of framework 69. This motor drives a worm 87 which threads into threaded aperture 89 of travelling block 88. Travel block 88 is also provided for alignment purposes, with an aperture 90 accommodating smooth rod 91, which keeps the block from turning during transit. Block 88 includes pulleys 92 and 93 which are mounted by pivot posts 94 and 95 to the block. Keyed to each of the pulleys in a respective gear 96 and 97, the same meshing with an idler gear 98. Pinion 99 is keyed to shaft 100 of motor 101 and engages gear 98. Elongate flexible connectors 102 and 103 in FIGS. 6 and 7 may comprise cables, for example, which are oriented in the manner shown in FIGS. 6 amd 7. Idler pulleys 104, 105, 106, and 107, are clearly seen in FIG. 6 to cooperate with the cables 102 and 103 in the manner indicated. There are also end pulleys 108–111 which are journaled to framework 69 and accommodate the extension of cables 102 and 103 in the manner shown in FIG. 3. These cables are anchored by U-bolts or other suitable means at 112 and 113 in FIG. 3.

Figure 6:
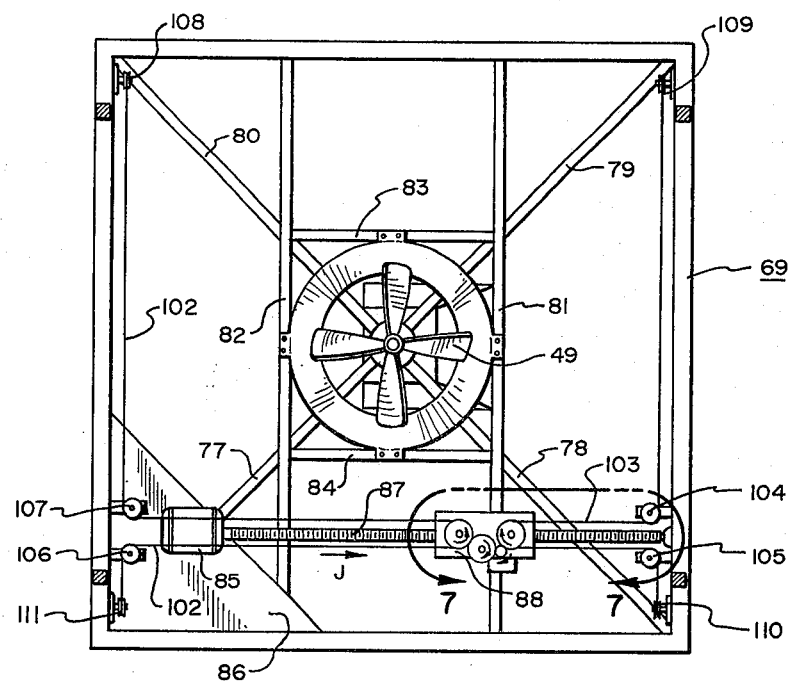
FIG. 6 is a plan view taken along the lines 6—6 in FIG. 5, showing certain tilt structure.
Figure 7:
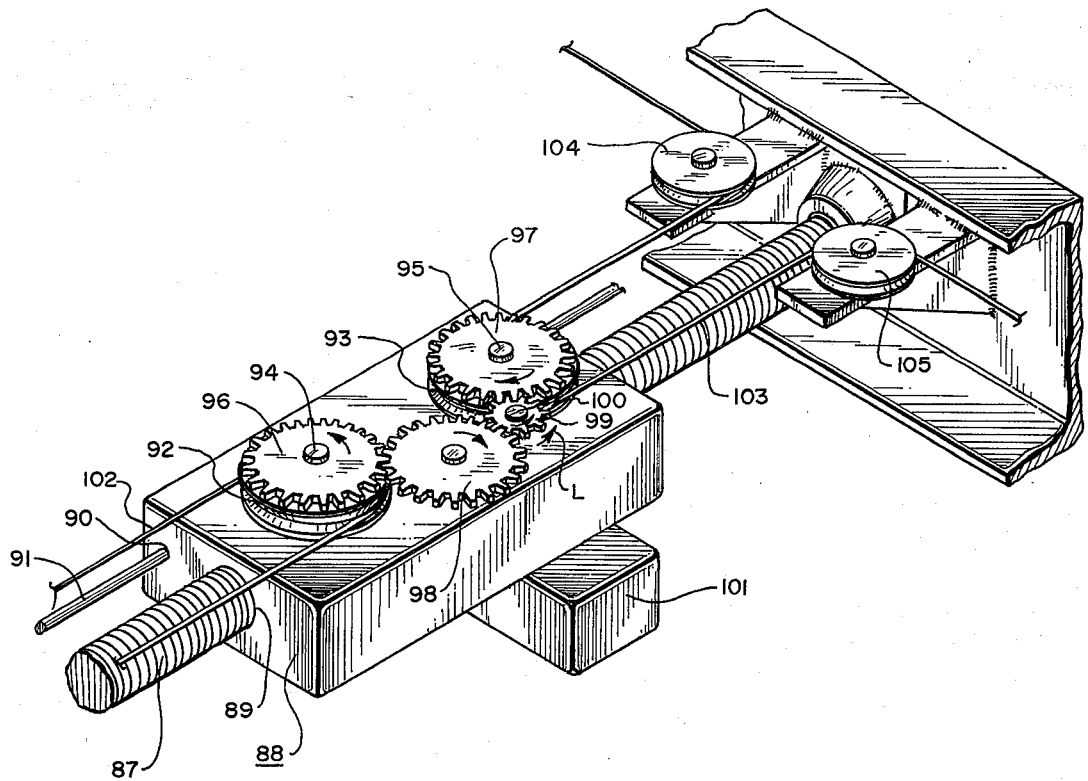
FIG. 7 is an enlarged, fragmentary, perspective view of the worm and block structure used in FIG. 6 for tilting the apparatus in one direction, to accommodate solar position.

In accomplishing the tilt function, assume that motor 85 driving worm 87 is actuated by its electrical switch, not shown for convenience. The revolvement of worm 87 in a manner such as to advance the block in the direction J in FIG. 6 tends to pull on the cable 102 so as to lower the left side of the structure in FIG. 6 and accordingly raise the right side of the structure in FIG. 6, since the cable 103 is effectively lengthened by the direction of travel of block 88 to the right in accordance with arrow J. When the worm 87 is revolved in the opposite direction, then just the reverse action takes place so that the right side this time is lower than the left side raised.

Where motor 101 in FIG. 7 is actuated so as to revolve shaft 100 and pinion 99, than the revolvement of shaft 100 in the direction of arrow L will produce a corresponding pinion 99 revolvement and counter-revolvements of pulleys 92 and 93 in the direction of the arrows indicated in FIG. 7, so as to tilt framework 69 in FIG. 6 downwardly at its base and raise the opposite side, i.e. to the top of the drawing in FIG. 6. A corresponding but opposite action will take place when motor 101 is actuated in a reverse direction so as to revolve pinion 100 reverse to that shown by arrow L.

Accordingly, the structure is able to tilt the framework 10 in FIG. 1 in any of the four directions or any combination of the same. It is to be noted that motors 85 and 101 will be reversing motors of any standard type.

Accordingly, what is provided is a new and useful structure for capturing the sun's energy and utilizing the same to drive a gas turbine in a hightly efficient manner.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A solar-powered, gas-turbine apparatus including, in combination, a screen having a central window; first and second heat-conductive hollow means for storing and releasing gas under pressure; a gas turbine interposed between and operatively communicating with said first and second means; track means mounting said first and second means for enabling the alternating disposition of one of said first and second means in registry position with said window; and an output drive coupled to said gas turbine.

2. The structure of claim 1 wherein said screen is concave, having in the aggregate a concave reflective surface surrounding said window.

3. The structure of claim 1 wherein each of said first and second means comprises an essentially planar, serpentine conduit configurement.

4. The structure of claim 1 wherein said apparatus includes fan means disposed in registry with said window and in spaced relationship therewith, said first and second means being disposed in a common plane between said window and said fan means.

5. The structure of claim 1 wherein said apparatus is provided with spray means for selectively spraying a selected one of said first and second means.

6. The structure of claim 2 wherein said screen comprises a framework holding a series of mirrors forming said reflective surface.

7. The structure of claim 1 wherein said apparatus includes means coupled to said screen for tilting the same, whereby said screen may be made to face the sun.

8. The structure of claim 5 wherein said apparatus is provided with means for draining sprayed fluid away from said first and second means.

9. A solar-powered, gas turbine structure including, in combination, a screen having a window, first and second heat conductive hollow means for storing and releasing gas under pressure, a gas turbine operatively interposed between said first and second means, track means fixedly disposed with respect to said screen for movably mounting said first and second means, whereby a selected one of said first and second means can be positioned in registry with said window, means for spraying said first and second means disposed at opposite sides of said window, fan means positioned proximate said window for cooling a respective one of said first and second means disposed thereat, first and second storage tanks, and means for conducting fluid from said storage tanks to said spraying means and returning such sprayed fluid back to said storage tanks.

* * * * *